Oct. 22, 1940. M. JACOBS 2,219,161

PIPE COUPLING

Filed Nov. 28, 1938

INVENTOR.
MAYHELT JACOBS
BY A. Denham Oliver
ATTORNEY.

Patented Oct. 22, 1940

2,219,161

UNITED STATES PATENT OFFICE 2,219,161

PIPE COUPLING

Mayhelt Jacobs, San Francisco, Calif., assignor to Pacific Pipe Co., San Francisco, Calif., a corporation of California Application November 28, 1938, Serial No. 242,735

1 Claim. (Cl. 285—129)

My invention relates to pipe couplings, and particularly to a readily connected and disconnected form of pipe and coupling which may be used in irrigating It is common practice in irrigation to use a system of branched pipes to direct water throughout each section from a main source, such as a pipe line, well, or standpipe. Between irrigating seasons, the pipes may be taken up and stored, or they may be removed to facilitate cultivating. Light sheet metal pipe or tubing such as galvanized iron, is used, and ordinarily the joints between successive pipe sections are made by force-fitting male and female coupling segments similar to those used in stove-pipe.

Such joints are, however, difficult to connect, and may readily become so distorted by warping of the pipe or by careless handling that they will leak badly. In addition, when joined well enough to be water-tight, they are quite rigid, and irregularities in the ground level and the avoidance of natural obstacles may require the insertion of specially bent sections, such as elbows.

Various types of joints and couplings have been developed, but are open to the objections that they require the use of special tools or wrenches in assembly, that they need many small parts such as nuts and bolts which may be easily lost, that they are too expensive to be used widely, that they require an excessive amount of time in assembly and disassembly, or that they have no inherent flexibility.

The coupling which I have invented overcomes these objections by using a special form of flexible self-sealing gasket to be inserted between beaded ends of adjacent pipe sections and held under compression by a snap-latched clamp fitting around the pipe ends.

It is thus an object of my invention to provide a pipe coupling having few parts;

To provide a coupling which may be quickly connected and disconnected;

To provide a coupling requiring no tools for assembly and disassembly;

To provide a coupling which does not require successive pipe sections to be in strict alignment;

To provide a pipe coupling having a certain degree of flexibility without loss of sealing effectiveness;

To provide a coupling in which the pressure within the pipe assists in maintaining a tight seal;

To provide a coupling which will not "blow out" due to pressure within the pipes;

To provide a coupling gasket in a form minimizing any tendency to warp;

To provide a coupling which will not collapse under negative pressure within the pipe conduits; and To provide a coupling which may be manufactured with a minimum expense from readily procurable materials.

The invention possesses other objects and features of advantage, some of which, with the foregoing, will be set forth in the following description of a preferred form of my invention which is illustrated in the drawing accompanying and forming a part of the specification. It is to be understood that I do not limit myself to the showing made by the drawing and description as I may adopt a variation of the preferred form within the scope of my invention as set forth in the claim.

The details of my invention may be better understood by reference to the figures wherein.

Figure 1:
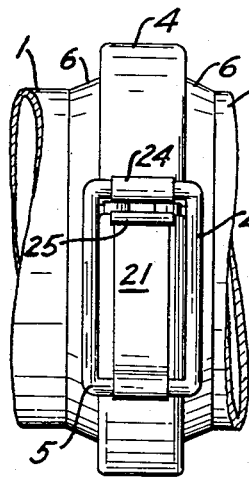
Fig. 1 is an elevational view of my clamp joining two sections of pipe.
Figure 2:
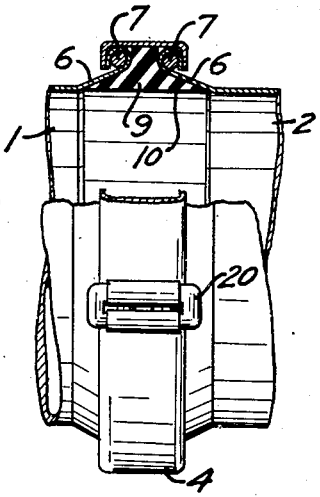
Fig. 2 is a view partially in section of the same clamp and pipe sections taken from the side opposite to that shown in Fig. 1.

Referring now to Figs. 1 and 2, I have shown two sections of irrigation pipe 1 and 2 joined by a clamp 4 having a latch 5. The adjacent ends of pipes 1 and 2 are flared outwardly, forming frusto-conical end sections 6, and are strengthened at their extremities by beading or rolling the edge, preferably over a reinforcing wire or rod 7. Between the adjacent end sections 6, I place a rubber gasket 9 having an inner cylindrical surface 10 which forms a continuation of the inner surfaces of pipes 1 and 2. The outer portion of the gasket, which is shown in detail in Fig. 5, comprises a radially extending rib 11 which merges into conical sections 12 extending to either end of the gasket and intersecting the inner cylindrical surface 10 to form knife edges 14. The conical portions 12 are formed at the same angle with inner cylindrical surfaces 10 as are the frusto-conical pipe ends 6, so the knife edges 14 act as sealing lips when pressure is exerted thereagainst by water within the pipes. The radially extending rib 11 also is pressed into sealing engagement with the beaded frusto-conical ends 6 by the action of clamp 4 placed therearound, but I intend the major sealing effect to be accomplished by the gasket portions terminated by knife edge 14. The clamp 4 consists of two semi-cylindrical bands 16 and 17 having flanges 19 extending radially inward therefrom. A hinge ring 20 connects two adjacent ends of each of the semi-cylindrical clamp members 16 and 17, while the other adjacent ends of these members are joined by the snap latch 5. This snap latch consists of a tongue 21 pivotally connected to the outer end of a link 22, the inner end of which is pivotally held by a rolled-over segment 24 on the clamp member 16. The adjacent end of the other clamp member 17 also has a rolled-over segment or ear 25 against which the tongue 21 may rest. When the pipe sections 1 and 2 have been joined together about gasket 9, the clamp 4 is placed around the ends 6 of the pipes. By nesting the tongue 21 against the ear 25 and forcing snap latch 5 down against clamp member 17, sufficient pressure may be produced to draw the pipe ends tightly against the projecting rib 11 of the gasket, compressing it to produce part of the sealing action. By familiar principles of mechanics, as soon as the latch 5 has been forced down against the semi-cylindrical section 17 to which ear 25 is fixed, far enough so that the line of resistive force exerted through the tongue 21 passes beneath the ear, the latch is firmly held in position and will remain in that position until the tongue 21 and the end of link 22 to which it is joined are forced outwardly, which may be done by a workman wherever it is desired to disconnect the pipe section.

Figure 3:
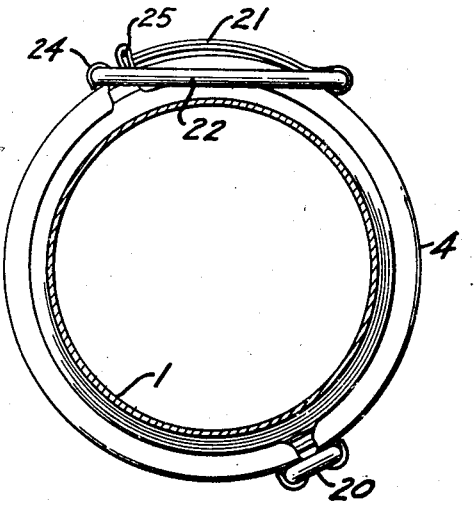
Fig. 3 is an end view of my clamp applied to the pipes, the latter being shown partly in section.
Figure 4:
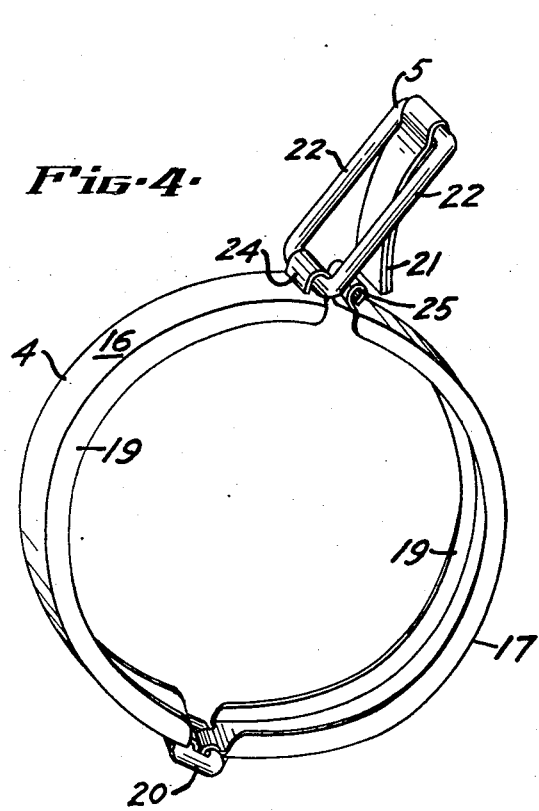
Fig. 4 is a perspective view of my clamp unlatched, shown separately from the pipes and gasket.

Fig. 3 shows in end view the manner in which the ear 25 and the tongue 21 cooperate to produce this clamping effect. It will be obvious that no amount of stress less than that required to produce actual structural failure in the metal will cause the latch to become disconnected without the aid of an outside force.

Figure 5:
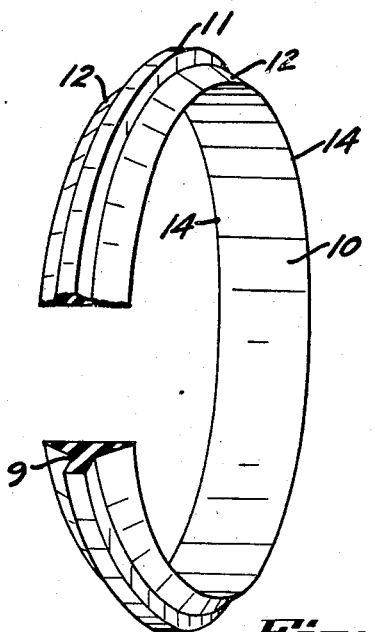
Fig. 5 is a perspective view, partially in section, of my preferred form of gasket.

The form of gasket which I have shown in detail in Fig. 5 has been found eminently satisfactory in service. The rib 11 stiffens the gasket and prevents the tendency sometimes experienced in gaskets having thin sealing lips, to warp so that the sealing lips fail properly to seat against the members with which they should be in tight engagement, or to collapse under negative pressure within the pipes 1 and 2. Further, the fact that the rib 11 is held tightly in position by the ends 6 of the clamped pipes tends to restrain the washer in its desired position, while at the same time the resilient nature of the washer permits the pipes to rock or bend at the joints, imparting desirable flexibility.

For certain types of service, however, I find it desirable to insert a reinforcing or stiffening member in the rib during the molding of the gasket, resisting tendencies toward either blowing out or collapsing. This member has not been shown in the figures inasmuch as it is well-known practice in the gasket art to mold in such inserts wherever needed to provide additional strength and rigidity.

When it is desired to change the location of the pipes, it is only necessary for the workman to pull outwardly on the tongue 21 in order to release the clamp and free the adjacent pipe sections from each other. This operation can be performed in an instant and makes it possible to take down the irrigating system as fast as the workmen can move from one joint to the next.

The resilient nature of the rubber gasket makes it possible to provide a certain degree of flexibility in the assembly, which is aided by the conical engaging surfaces 12. I find that a 7° divergence between successive pipe sections can readily be obtained. This will be recognized by those familiar with the irrigation practice as a decided advantage in view of the irregular character of much irrigated land. These irregularities can be provided for without resorting to elbows or other bent pipe sections, and yet without interfering with the satisfactory nature of the seal between successive sections.

It will thus be seen that I have provided a pipe coupling which can be rapidly and easily used to unite separate sections of pipe without resorting to tools or special equipment, and can as readily be disassembled. My construction insures tightly sealed joints regardless of the nature of the terrain, and permits some flexibility between adjacent pipe sections. The number of parts has been reduced to a minimum, and the structure shown may be manufactured economically from easily procurable materials.

What I claim is:

In a pipe coupling, a pair of pipes having frusto-conical outwardly flared ends terminating in beads, a gasket interposed between said beads, and a channeled clamping ring comprising a pair of semi-cylindrical bands linked together at one end of each semi-cylindrical portion, said ring having beads at the free ends thereof, a link pivoted to one of said clamped beads, a tongue pivoted to the free end of said link, whereby in clamping position the free end of said tongue will contact the other of said clamp beads to contract said clamp ring by toggle action and draw the sides of said clamp channel into engagement with said pipe beads and the latter into firm contact with said gasket.

MAYHELT JACOBS.